United States Patent Office 2,870,399
Patented Jan. 20, 1959

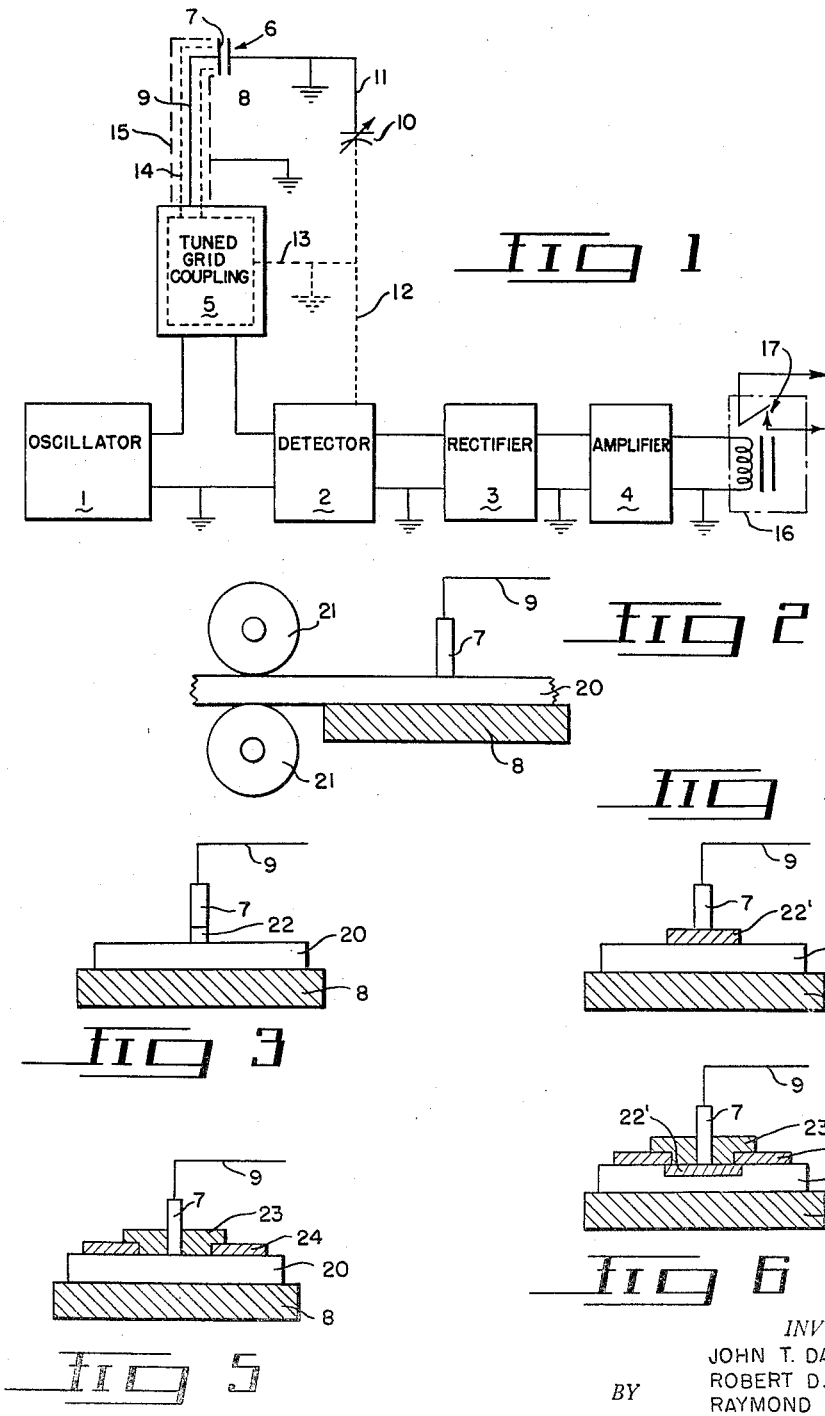

2,870,399

CAPACITOR CONTROL UNIT

John T. Davidson and Robert D. Georgen, Dayton, and Raymond L. Fortune, Trotwood, Ohio, assignors to The Standard Register Company, Dayton, Ohio, a corporation of Ohio Application January 5, 1954, Serial No. 402,358

8 Claims. (Cl. 323—75)

This invention relates to a control unit for actuating various types of machines, and more particularly to a means for energizing such control unit by the passage of a code or control mark past a reading or sensing station forming a part of the control unit.

While the control unit forming the subject matter hereof is particularly adapted to the control of business machines, such as bookkeeping and adding machines, calculators, punches, tabulators and the like, it may be used for the control of other types of machines with equal facility.

The object of the invention is to simplify the construction as well as the means and mode of operation of control units as disclosed herein, whereby such units may not only be economically manufactured, but will be more efficient and satisfactory in use, adaptable to a wide variety of applications and be unlikely to get out of order.

A further object of the invention is to provide a very sensitive control unit, responsive to slight changes in the actuating or tripping medium.

A further object of the invention is to provide a unit such as disclosed herein which is in no way dependent upon the conduction of an electric current or potential through the tripping or actuating medium.

A further object of the invention is to provide a control unit which is responsive to minute changes in capacitance of an otherwise tuned or balanced capacitance bridge circuit.

A further object of the invention is to provide means by which the unit can reject unintentional changes in capacitance.

A further object of the invention is to provide means for changing the capacitance of said control unit.

A further object of the invention is to provide means for changing the capacitance of the circuit by passage of a strip therethrough having areas of different characteristics.

A further object of the invention is to provide means for altering the dielectric or the plate area of a capacitor comprising one element of the control circuit.

A further object of the invention is to provide a control circuit possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings or their equivalents.

Referring to the accompanying drawing, wherein is shown, in schematic diagram, one but obviously not necessarily the only form of embodiment of the invention, Fig. 1 is a diagram of the entire control circuit and its component parts;

Fig. 2 is a diagrammatic showing of the sensing head under normal conditions, together with a feeding device for the strip;

Fig. 3 is a view showing the sensing head under abnormal or actuated condition; and Figs. 4, 5 and 6 are similar to Figs. 2 and 3, but showing another form of sensing head, or control area, or both.

Like parts are indicated by similar characters of reference throughout the several views.

Referring to the drawing, a control unit in accordance with the instant invention includes a capacitance bridge circuit having an oscillator 1, a detector 2, a rectifier 3 and an amplifier 4. The oscillator 1 feeds a signal (such as 450–500 kc.) to a tuned grid circuit of the detector or radio frequency amplifier 2. Connected into the tuned grid circuit of the detector 2 is a tuned grid coupling unit 5.

As a component part of the coupling unit 5 there is a sensing head, generally designated 6, located externally of the coupling unit. The head 6 comprises generally a variable capacitor having a pair of spaced plates 7 and 8. It being understood that a variable capacitor is one in which the capacitance is changeable in any manner, as for example, through change of effective plate area, change of the spacing between the plates, change of the dielectric, or any combination of such changes. Plate 7 is connected to the coupling 5 by conductor 9 while plate 8 is connected to ground and also to a variable capacitor 10 by conductor 11. The other side of the capacitor 10 is connected to the R. F. ground (the oscillator output level) by conductors 12 and 13. Conductor 12 is connected to the I. F. transformer housing in detector 2, while conductor 13 is connected to a shield surrounding the coupling unit 5.

The lead 9 connecting the external sensing head 6 with the coupling unit 5 is also double shielded, the inner shield 14 being connected to the R. F. ground and the outer shield 15 being grounded.

Since the capacitance change to be sensed by the external head 6 may be on the order of 1 mmfd. (micro-microfarad) or less, it is absolutely necessary to protect the circuit from small variations of capacitance which would interfere with the proper operation. Any stray capacitance change introduced by physical movement of the sensing head 6, as well as line voltage variation must be considered when dealing with an extremely sensitive circuit of this type.

The double shield about lead 9, and the shielded housings about the I. F. transformer and coupling unit 5 are for the purpose of minimizing such stray capacitance change. In addition a well regulated D. C. power supply should be employed to power the circuit. An automatic gain control circuit is also advantageously used to compensate for relatively slow steady changes such as might be caused by variations in humidity and temperature, or a slow steady change in the balance level of the circuit. The time constant of such automatic gain control circuit is so chosen that, to the utmost extent possible, it will acknowledge intentional change in capacity, but discriminate against other natural or artificial variations.

Variable capacitor 10 is used to provide a minute adjustment of the capacitance of the sensing head 6 to enable accurate balancing of the capacitance bridge circuit under normal operating conditions. Under normal conditions, the output of the bridge circuit is insufficient to energize a sensitive relay 16. However, upon a change in capacitance, although of very small amount, as sensed by the sensing head 6, the output of the amplifier 4 is then sufficient to actuate the sensitive relay 16, the contacts 17 of which are used to control a work element or some further external circuit connected to the contacts 17.

Turning to Figs. 2 and 6, inclusive, these show somewhat diagrammatically several types of sensing heads 6 and their operation. Also shown in these figures is a control strip 20 and its control area.

The upper plate 7 of the sensing head 6 is formed by the bottom surface of a wire or rod like member, and is of relatively small area. The effective area of the upper plate 7 is particularly small in relation to the area of the bottom plate 8. The plates 7 and 8 are held in spaced relation, the spacing being sufficient to permit the free passage of a control strip 20 therethrough. The control strip is preferably although not necessarily of paper, and may comprise either a continuous strip of series connected forms, or may comprise a single sheet or form. Whether of the continuous or single sheet type, the control strip 20 is progressively advanced through the sensing head 6 by a feeding device 21.

Located upon the strip 20 is a control area 22, which as it passes through the sensing head 6 alters the capacitance thereof and thereby unbalances the bridge circuit so that the output of amplifier 4 is sufficient to actuate the relay 16. The control area 22 may be of most any form and size. For example, the area 22 may be as small as one-sixteenth inch in diameter, or it may be equal to, or greater than, the area of the upper plate 7. The control area 22 preferably comprises a spot or area imprinted upon the control strip with a special ink which contains material capable of altering the capacitance of the head 6. Such spot may be visible or invisible depending upon the particular application, and it may also be imprinted on the strip at the time the strip is printed, at the time the strip is processed, or it may be imprinted on the strip at another time and in a separate operation.

Location of the area 22 longitudinally of the strip is determined in accordance with the particular purpose to be accomplished. If the external circuit or work element is to be energized in timed relation with a particular portion of the control strip, the location of the area 22 longitudinally of the strip is of course determinative of the exact moment when relay 16 will be energized. On the other hand, if the time is not critical then the area 22 may be located anywhere longitudinally of the strip. The transverse location of the area relative to the strip is of course determined by the transverse location of the sensing head 6 relative to the strip.

Referring to Figs. 2 and 3, Fig. 2 shows the sensing head under normal conditions wherein the bridge circuit to which it is connected is balanced. The control strip 20 is being advanced intermediate the plates 7—8 of the sensing head by the feeding device 21. Fig. 3 shows the same sensing head, but a change of capacitance by a change in the dielectric. The control area 22 is of the same size as the plate 7, but alters the dielectric strength of the strip 20. Thus as the strip with its control area 22 passes beneath the plate 7, the capacitance of the circuit is momentarily altered due to the change in dielectric.

Figs. 2 to 6 are of course on a greatly enlarged scale. The actual control strip 20 and the special control area 22 are no where near the thickness shown in these views. The control area 22 is barely discernible on the surface of the strip 20 in actual use.

Fig. 4 is similar to Figs. 2 and 3 except that the control area 22′ is of greater size than the plate 7 of the head. In this instance not only is the dielectric altered within the control area 22′, but the effective area of the plate 7 is also momentarily increased as the strip 20 and its control area 22′ passes through the head.

The control area 22 or 22′ is not conductive in the sense that it provides a circuit for the direct flow of current from plate 7 to plate 8 through the strip 20. In this respect, the present development differs materially from prior devices in which a conductive spot or a hole or similar type of device was used to provide direct contact between upper and lower contacts in an electrical circuit. In the present disclosure there is at no time direct contact or flow of current from the upper plate 7 to the lower plate 8. The material which is incorporated in the special ink forming the area 22 or 22′ may be of a metallic nature so that although finely dispersed within the ink, the resulting spot will act as a plate at least across its surface.

Thus as shown in Fig. 4, when the area 22′ comes under the upper plate 7, it increases the effective area of the plate so as to alter the capacitance of the head 6.

Figs. 5 and 6 show a further modification of the head 6 in which the effective area of the upper plate 7 is greatly increased by the passage of the control area 22′. In this modification, the effective area of the plate 7 becomes considerably greater than the control area 22′. Surrounding the plate 7 is an insulating member 23. In surrounding relation to the insulating member 23 is a metal plate 24, the plate 7, insulating member 23 and plate 24 comprising a unitary structure. In the absence of a spot 22′ the plate 24 is insulated from the plate 7, and consequently has no effect upon the plate 7 or the capacitance of the sensing head.

The size of the insulating member 23 is slightly smaller than the size of the control area 22′. Thus when the control area 22′ passes through the sensing head it momentarily couples the plate 7 and the surrounding auxiliary plate 24 to form a greatly enlarged upper plate as shown in Fig. 6. The capacitance of the head 6 is therefore altered due to the change in effective plate area.

Since the capacity of a condenser is determined by multiplying the area of the smallest effective plate by the value of the dielectric between the plates and dividing this product by the distance between the plates, it will be seen that any change in dielectric (Figs. 3, 4 and 6) or any change in effective plate area (Figs. 4 and 6) or a combination thereof, will alter the capacitance of the sensing head. The change in capacitance produced by passage of the control area 22 or 22′ through the sensing head, regardless of how the change is accomplished, is sufficient to unbalance the bridge circuit. The output of the momentarily unbalanced bridge circuit is sufficient to energize the relay 16 which in turn actuates a work element comprising a further piece of equipment or energizes a further circuit in the equipment so as to perform a further operation in timed relation with the advancement of the strip.

The control unit described herein may be used in multiple so that multiple control areas arranged in predetermined zones on the strip may be simultaneously or consecutively sensed for translation of such recorded information into electrical impulses for the operation of other equipment.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. In an energizing circuit for a work element having a normally balanced capacitance bridge control circuit, the output of which is insufficient to energize the work element, means for momentarily and automatically unbalancing said circuit to increase the output thereof to a value sufficient to energize the work element, comprising a sensing head including a parallel plate condenser forming a part of said circuit, a variable capacitor in said circuit to accurately balance said circuit for normal operation, means preventing unintentional unbalancing of said circuit including a pair of concentric shields about a lead to the sensing head, the innermost of which is connected to one plate of said parallel plate condenser, the outermost of which is grounded, and means having spaced metallic spots imprinted thereon progressively advancing through said parallel plate condenser for intentionally unbalancing said circuit by timed disposition of said spots intermediate the plates of parallel plate condenser to thereby alter the reactance of said condenser and unbalance the normally balanced control circuit.

2. In a strip controlled mechanism a variable capacitance sensing head for energizing a work element upon a predetermined change of capacitance in said head, said sensing head comprising spaced apart plates, one of which is smaller than the other, a supplemental plate surrounding said smaller plate in concentric spaced relation, an insulating element intermediate said smaller plate and supplemental plate, a strip movable through said spaced apart plates without changing the capacitance thereof, a specially prepared means on said strip passage of which through said plates couples the supplemental plate and the smaller plate to increase the effective area of said smaller plate and thereby change the capacitance of said sensing head said predetermined amount sufficient to energize the work element.

3. In a strip controlled mechanism, a variable capacitor having a pair of spaced apart plates, a movable dielectric strip therebetween, means for moving the dielectric strip, and means on said strip for successively increasing and decreasing the effective area of at least one of said plates in timed relation with the movement of the dielectric strip, including a supplemental plate surrounding the one of said plates in concentric spaced relation therewith, and specially prepared means on said dielectric strip which as it passes said one of said plates couples said plate with the supplemental plate to thereby increase the effective area of said one of said plates.

4. In a strip controlled mechanism, a sensing head comprising, a parallel plate capacitor, dielectric control means progressively advancing through said capacitor intermediate the plates thereof having means imposed thereon for periodically and momentarily engaging with at least one of the plates of said capacitor to alter the effective area thereof and thereby vary the capacitance of said sensing head.

5. In a strip controlled mechanism, for use in combination in a normally balanced capacitance bridge control circuit, a variable capacitance sensing head for energizing a work element on a predetermined change in capacitance in said head, said head including spaced apart plates, a dielectric strip movable between said spaced apart plates, and means applied to said strip operative to couple to one of said plates for varying the capacitance of said head in timed relation to movement of said strip.

6. In a strip controlled mechanism, for use in combination in a normally balanced capacitance bridge control circuit, a variable capacitance sensing head for energizing a work element upon a predetermined change of capacitance in said head, said head including spaced apart plates, a strip dielectric movable between said plates having a predetermined value for maintaining the control circuit in normal balance, means for advancing said strip dielectric between said plates, and ink imprints imposed at preselected intervals on said dielectric strip for varying the capacitance of said sensing head on contact with one of said plates in predetermined timed relation to the advancement of said dielectric strip.

7. In a strip controlled mechanism, a sensing head comprising, a variable capacitor, means for advancing a dielectric control strip therethrough, preselected portions of said strip having means applied thereto varying the capacitance of said sensing head as said portions pass through said head.

8. In a strip controlled mechanism, a variable capacitor having a pair of relatively fixed spaced apart plates, a dielectric strip movable therebetween, means for moving the dielectric strip, and imprinted means imposed on said strip for varying the effective area of at least one of said plates in timed relation to the movement of said strip between said plates.

References Cited in the file of this patent

UNITED STATES PATENTS

| 1,824,745 | Allen | Sept. 22, 1931 |
|---|---|---|
| 1,924,087 | Allen | Aug. 29, 1933 |
| 2,474,156 | Nameny-Katz | June 21, 1949 |
| 2,476,954 | Blackburn | July 26, 1949 |
| 2,546,784 | Roggenstein | Mar. 27, 1951 |
| 2,574,261 | Hagan | Nov. 6, 1951 |
| 2,589,535 | Calvert | Mar. 18, 1952 |
| 2,606,310 | Baker | Aug. 5, 1952 |
| 2,692,972 | Edgerton | Oct. 26, 1954 |
| 2,718,620 | Howe | Sept. 20, 1955 |